March 17, 1942.  R. COUCHMAN  2,276,468
EXTRUSION DIE
Filed Nov. 19, 1940
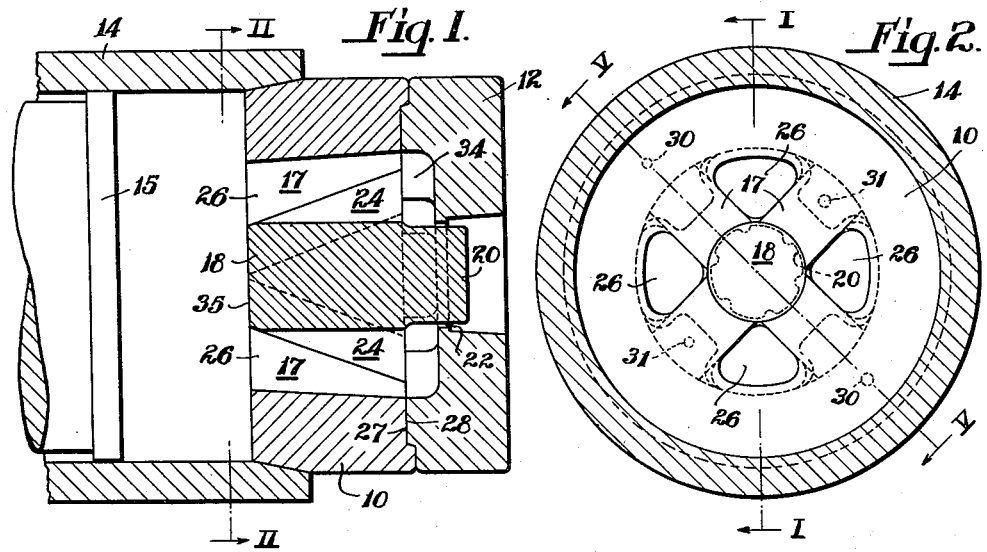
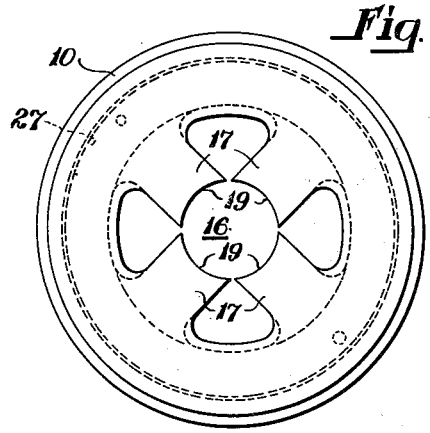
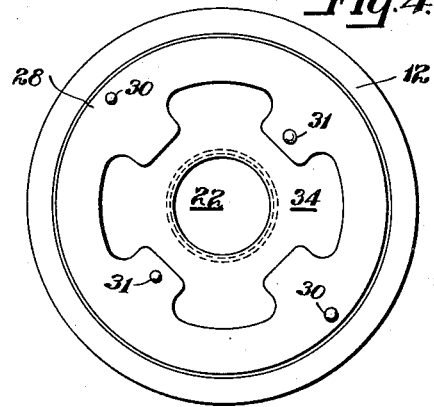
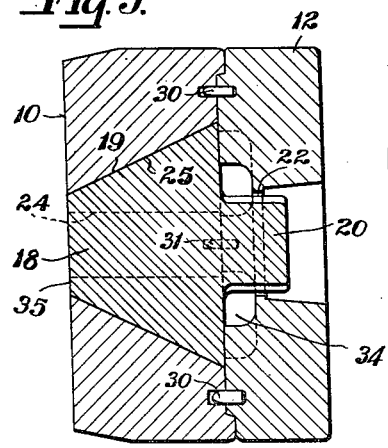
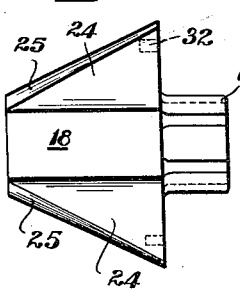
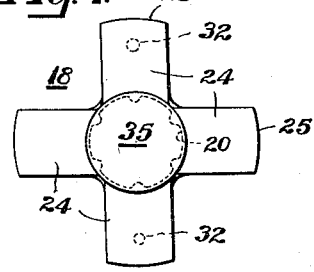
INVENTOR
Richard Couchman
BY
S. Ernest Low.
ATTORNEY Patented Mar. 17, 1942

2,276,468

UNITED STATES PATENT OFFICE 2,276,468

EXTRUSION DIE

Richard Couchman, New Kensington, Pa., assignor to Aluminum Company of America, Pittsburgh, Pa., a corporation of Pennsylvania Application November 19, 1940, Serial No. 366,254

8 Claims. (Cl. 207—17)

The invention, hereinafter described in detail, relates in general to means for extruding plastic materials. More specifically, the invention is directed to an extrusion mechanism suitable for production of tubular sections or shapes from unpierced or unperforated metal charges or billets.

Essentially the present invention relates to improved extrusion die structures of the general type known as "porthole" dies which normally comprise a front male or mandrel die and a back female or exterior contour-controlling die arranged in cooperative extrusion relationship. In the operation of porthole extrusion dies, material of an unperforated billet or solid charge divides itself under the influence of pressure into one or more streams which flow through suitable passages in the front die and around the mandrel, where the material coalesces in a mixing or welding chamber adjacent the entrance to a die aperture in the back die. Continued extrusion pressure causes the material of the billet to be forced out of the welding chamber and to be extruded through a die orifice defined between the aperture in the female die and the mandrel to produce lengths of tubular section.

Porthole dies are classifiable into two general classes: (1) those in which the mandrel member is a separate element, generally of cruciform cross-section, disposed in cooperative relationship with an exterior contour-controlling die member, such as disclosed in United States Letters Patent 2,031,008, patented February 18, 1936; and (2) those in which the mandrel is an integral part of the front die member, as disclosed in United States Letters Patent 2,135,194, patented November 1, 1938.

Both classes of porthole dies referred to hereinabove have certain characteristic inherent structural features and advantages over those well-known extrusion mechanisms which employ a mandrel that extends through the entire length of a perforated billet, or pierces a solid billet, during an extrusion operation. For example, porthole dies eliminate the necessity of providing pierced or cast hollow billets, and the relatively short mandrel employed in porthole dies serves to insure the production of extruded shapes of uniform cross-section, as distinguished from non-uniform or eccentric tubular sections which normally result from the characteristic radial shifting of a through-type mandrel, relative to its cooperating female die, during an extrusion operation.

It is known that the stresses developed in porthole dies are normally greater in magnitude than those developed in other types of extrusion mechanisms engaged in the production of identical extruded sections or shapes. Pressures as high as 150,000 pounds per square inch adjacent a porthole die are not uncommon, and the resulting stresses in the die are often greater than the die structure can withstand, with the result that the die is fractured and must be replaced.

The pressures, generally associated with porthole dies, vary for different materials and alloys being extruded, and it is well known that the pressures experienced at the beginning of an extrusion operation are greatly in excess of the pressures developed after the material of a billet has commenced to flow under the continued applied extrusion force. Generally, however, the pressures developed adjacent porthole dies, and the stresses produced thereby, are directly associated with the disposition, number, contour, and shape of the passages for conducting the material under extrusion through the front dies to their die orifices, and the stresses usually encountered can normally be defined in terms of bending and radial bursting stresses.

It is a primary object of the present invention to provide a porthole die structure of the general type including a separate mandrel member, which incorporates structural features that are instrumental in separating the radial bursting stresses from the bending stresses which are prevalent in presently employed porthole dies of this type.

It is another object to provide an improved form of porthole extrusion die which incorporates all of the advantages of present dies of this general class, but which also incorporates improved and superior features of construction.

A further object of the invention is to provide a porthole extrusion die of sturdy and rigid construction which may be readily disassembled for purposes of substituting or replacing elements thereof as desired.

Another object is to provide a porthole extrusion die structure capable of commercial production of a greater number and variety of extruded sections than is now possible with known extrusion die assemblies.

Other objects and advantages of the invention will be apparent on consideration of the following description of a specific embodiment of the present invention, when taken in conjunction with the drawing forming a part hereof, in which:

Fig. 1 represents a sectional elevation taken along the line I—I of Fig. 2, and disclosing an extrusion die assembly incorporating the novel features of the present invention in cooperative association with fragmentary portions of an extrusion billet cylinder and ram;

Fig. 2 represents a sectional elevation taken along the line II—II of Fig. 1;

Fig. 3 represents an end or front face view of the front die of this invention, as viewed from the left of Fig. 1;

Fig. 4 represents an end or front face view of the back die of the invention, as viewed from the left of Fig. 1;

Fig. 5 represents a sectional elevation taken along the line V—V of Fig. 2;

Fig. 6 represents an elevational view of the mandrel member forming a part of the associated die structure of the invention; and Fig. 7 represents an end view of the mandrel illustrated in Fig. 6, as viewed from the left thereof.

In its broadest aspect, the new and improved die structure of the present invention comprises a front die member adapted to support a mandrel member, the front die and mandrel member being cooperatively assembled to provide a passage, or plurality of passages, therethrough for conducting material to be extruded into a coalescing chamber immediately adjacent a back die member having an aperture associated with a protruding portion of the mandrel to define a die orifice. The structure for supporting the mandrel within its associated front die is a significant feature of the present invention in that the mandrel is supported in a manner heretofore unknown in the art directed to porthole type extrusion die structures.

The mandrel is preferably of plug-type construction and is suitably provided with circumferentially disposed ribs or wings which are tapered or stepped, divergently forwardly in the direction of flow of material through the passage or passages defined between the mandrel and front die. The front die is likewise provided with a complementary tapered or stepped bore for receiving the mandrel. On assembly of the mandrel within the bore in the front die, a cross-sectional area of mandrel is presented in pressure-resistant bearing contact with an extrusion billet which is appreciably less than the cross-sectional area of the mandrel at any point along the mandrel removed from the aforementioned area in pressure-resistant contact with the extrusion billet.

As a direct result of this form of front die and mandrel construction, the extrusion pressure tends to force the mandrel forwardly out of its front die-supporting member, as distinguished from that type of construction illustrated in the aforementioned United States Letters Patent 2,031,008 wherein the extrusion pressure is resolved into radial bursting pressure.

On reference to the drawings, which have been selected for purposes of illustrating a porthole type extrusion die assembly embodying the principles of the present invention, it will be noted that the general type of die structure best adapted to a realization of the present invention incorporates a front die member identified in its entirety by the reference numeral 10, and a back female or exterior contour-controlling die member 12. As is typical of this form of extrusion die assembly, a front die 10 and its complementary back die 12 are normally assembled in abutting co-axial relationship within a suitable tool holder or annulus (not shown), and a pair of die elements so assembled are adapted to be aligned with a billet cylinder 14. The alignment of the assembled dies is normally obtained through the medium of a suitable chamfered seal between the front die and billet cylinder, the latter being equipped with a reciprocatory ram 15 for the purpose of exerting the necessary pressure for extruding a billet (not shown) through the extrusion die assembly.

Front die member 10 is preferably constructed in the form of a cylindrical metal block provided with a bore 16 extending axially therethrough for the reception of a mandrel member 18 generally constructed in the form of a tapered plug of cruciform cross-section terminating in an interior contour-controlling mandrel tip 20. The mandrel tip 20 projects into a die aperture 22 in the back die 12, and serves to provide therebetween a die orifice defining the cross-section of the extruded shape to be produced.

The construction and assembly of the front die 10 and its associated mandrel member 18 are the important and significant features of the present invention. This portion of the structure of the invention will now be described in more detail with particular and specific reference being made to a die structure that has been successfully employed in the commercial production of magnesium alloy tubing provided with interiorly disposed integral ribs. The extruded product referred to herein is of no particular significance, but it does represent a product which has previously been produced in considerable quantity from perforated billets in an extrusion press employing a through-type mandrel and cooperating extrusion die.

In the preferred construction of front die 10, its bore 16 is provided with circumferentially spaced, inwardly projecting ribs 17, the inner edges 19 of which are concavely formed and preferably lie within a conic lateral surface defined by a generatrix whose vertex is located forwardly of (within the billet cylinder 14, as viewed in Fig. 1) the front face of die 10, and preferably co-axial with the longitudinal axis of the die member 10.

The mandrel member 18 is also provided with radial, circumferentially disposed ribs 24, equal in number to ribs 17. The outer edges 25 of ribs 24 are also preferably curvilinearly formed and lie within a conic lateral surface defined by the same generatrix, revolved about the same vertex, as employed in the formation of the inner edges 19 of ribs 17.

From reference to Figs. 1 and 5, it will be observed that mandrel member 18 is supported in assembled relationship within front die member 10. In their assembled association, ribs 17 and 24 are in registered, superposed, bearing relationship, the complementary curved surfaces presented by edges 19 and 25 of ribs 17 and 24, respectively, preferably serving to provide a press fit between mandrel 18 and die member 10. Ribs 17 and 24 are also preferably equal in width and length, and define therebetween passages 26 extending through the front die 10.

Back die member 12 is normally supported in proper axial registry with front die 10 through the medium of an accurately machined cavity 27 in the rear face of die 10 which is adapted to receive a tenon or upstanding surface 28 provided on the front face of back die 12. Dowel pins 30 further insure this registry of the front and back dies.

A further structural precaution is necessary in extrusion die assemblies of the general type herein contemplated to insure proper registry between the die aperture 22 and mandrel tip 20 for any given die orifice formed therebetween. In this connection, dowel pins 31 are provided within cooperating apertures 32 in the abutting end surfaces of ribs 24 and the front face of back die 12. Die 12 is also provided with a cavity 34 in its front face where the aforementioned passages 26 terminate. This cavity 34 serves as a coalescing or mixing chamber for the material being extruded.

In the adaption and operation of the extrusion tools of this invention, a mandrel of the general type hereinabove described, and having a mandrel tip 20 corresponding to the desired interior contour of the extruded shape to be produced, is inserted within the die 10 from the rear face of said die. As previously described, the mandrel is preferably an exact fit within the bore of die 10. Die 10, with its supported mandrel, is thereafter assembled with a back die 12 having an aperture 22 of proper configuration for controlling the exterior contour of the extruded shape to be produced. Assembled dies 10 and 12 are now placed in pressure-resistant and thrust association with respect to a billet cylinder 14 and the pressure-resisting platen (not shown) of an extrusion apparatus.

The material to be extruded is charged within cylinder 14 and is thereafter expressed under the influence of ram 15 through passages 26 into the chamber 34, continued pressure on the billet causing the material in chamber 34 to be extruded through the die orifice defined between mandrel tip 20 and die aperture 22.

From an analysis of die structures constructed in accordance with the present invention, it has been found that the load carried by the mandrel 18, as represented by the reduced area 35 of its end in contact with the billet being extruded, is relatively small in comparison with the load carried by the front face of die 10. This relatively small load on the mandrel is concentrated adjacent the ends of the ribs 24, where these ribs bear upon the front face of back die 12, and represents a compressive stress which is not resolved into radial bursting stresses within the die 10.

This condition is entirely distinguished from the stresses which are developed in a porthole die in which the mandrel is integrally connected by webs to the front die, in which case the webs act as bridge members and are subjected to severe bending stresses. Likewise, die structures in accordance with the present invention are distinguished over those porthole dies wherein the mandrel is a separate element and is supported upon wings or ribs within a cavity in the die in cooperation therewith, the cavity being one which converges toward the die orifice. In the latter instance the relatively large area of the mandrel, as measured in terms of the area of the webs and mandrel in contact with the end of the billet being extruded, represents a relatively high loading condition which tends to force the mandrel through the die orifice. The resultant force to this form of loading is resolved into bursting forces within the surrounding die member, and the bursting stresses thus developed are very often sufficiently high to fracture the surrounding die member.

It will be appreciated from a consideration of the general and specific description of the present invention that a die structure has been provided which adapts itself to stress distribution not heretofore possible in known extrusion die structures of the porthole type. It is also a significant characteristic of the die structures of the present invention that the mandrels may be replaced as desired without replacement of the front die.

Although a specific die structure has been selected for purposes of illustrating and describing the present invention, it is to be understood that the specific embodiment hereinabove illustrated and described is not to be interpreted as limiting the scope of the present invention, except as defined in the claims appended hereto.

What is claimed is:

1. In a porthole extrusion die structure, a front die member and a back die member, said front die being provided with a bore therethrough which is larger in the plane of its rear face than in the plane of its front face, and a mandrel member inserted within said bore from the rear face of said front die, said mandrel being supported upon a surface of said bore and having bearing contact with the back die member.

2. A porthole die structure comprising a front and a back die member, said die members being in pressure-resistant relationship, a mandrel supported within a forwardly diverging bore in said front die member and having a portion thereof extending into a die aperture in the back die member, and said mandrel having portions thereof in contact with said forwardly diverging bore as well as portions thereof in direct pressure-resistant bearing relationship with said back die member.

3. A porthole extrusion die structure comprising front and back die members in assembled abutting relationship, a forwardly diverging bore through said front die, a mandrel inserted within said bore from the most forwardly end thereof, said mandrel having radial webs in bearing contact with the bore to position the mandrel with respect thereto, said webs having end portions thereof in contact with the back die, said back die being provided with a die aperture in cooperative relationship with a projecting portion of the mandrel to provide a die orifice, and said diverging bore and mandrel webs cooperating to provide passages through the front die terminating adjacent the die orifice.

4. A porthole extrusion die structure comprising a front die member provided with a bore therethrough, said bore diverging forwardly through said die from its front to its rear face, a mandrel member inserted within said bore from the rear face of said die and supported radially on the surface of said bore, a back die member in thrust engagement with said front die and the mandrel member, said mandrel member having a tip portion in cooperative association with an aperture in the back die member to provide a die orifice.

5. In a porthole extrusion die assembly for extruding unpierced billets to form tubular sections, a front die member provided with a frusto-conical bore diverging forwardly therethrough, a mandrel member of cruciform cross-section disposed within said bore and supported radially upon the surface of said bore, said mandrel presenting a minimum cross-sectional area in the plane of the front face of the front die and a maximum cross-sectional area in the plane of the back face of the front die, a back die member in abutting thrust relationship with the back face of the front die and a portion of the maximum cross-sectional area of the mandrel member, and a portion of said mandrel member serving as a mandrel tip projecting forwardly into cooperative relationship with an aperture in the back die to provide a die orifice.

6. In an extrusion mechanism, an exterior contour-controlling die, a front die in thrust relationship therewith, a forwardly expanding bore extending through said front die, a mandrel supported upon a complementary surface of said bore and cooperating therewith to provide a passage through said front die, and said mandrel being in direct thrust relationship with said exterior contour-controlling die.

7. In an extrusion mechanism, a back die having a die aperture therethrough, a front die in abutting relationship with the back die and forwardly thereof, a forwardly diverging bore through said front die, a mandrel conforming in part with said bore and cooperating therewith to provide a passage through said front die in communication with the die aperture, said mandrel being inserted within said bore from its most forward end and being entirely supported in axial thrust relationship through direct bearing contact with the back die.

8. An extrusion apparatus comprising, in combination, a front die member provided with a forwardly diverging bore defined by circumferentially, inwardly projecting ribs, a mandrel member supported upon said ribs and presenting increasing cross-sectional area along its length as measured along the diverging bore, a back die in abutting, thrust relationship with said front die, and said back die being also in thrust abutting relationship with the largest cross-sectional area of the mandrel member.

RICHARD COUCHMAN.